Patented May 13, 1947

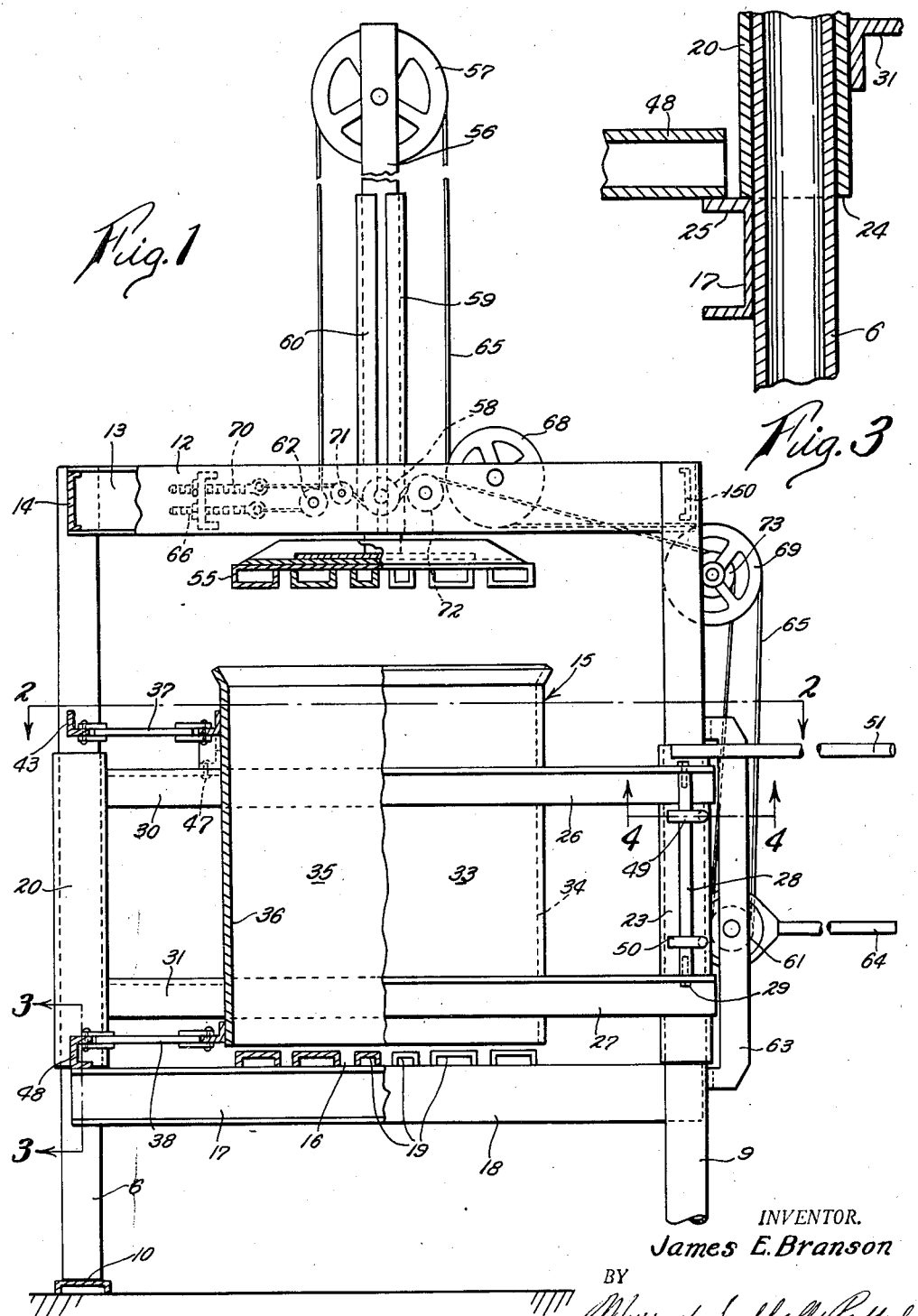

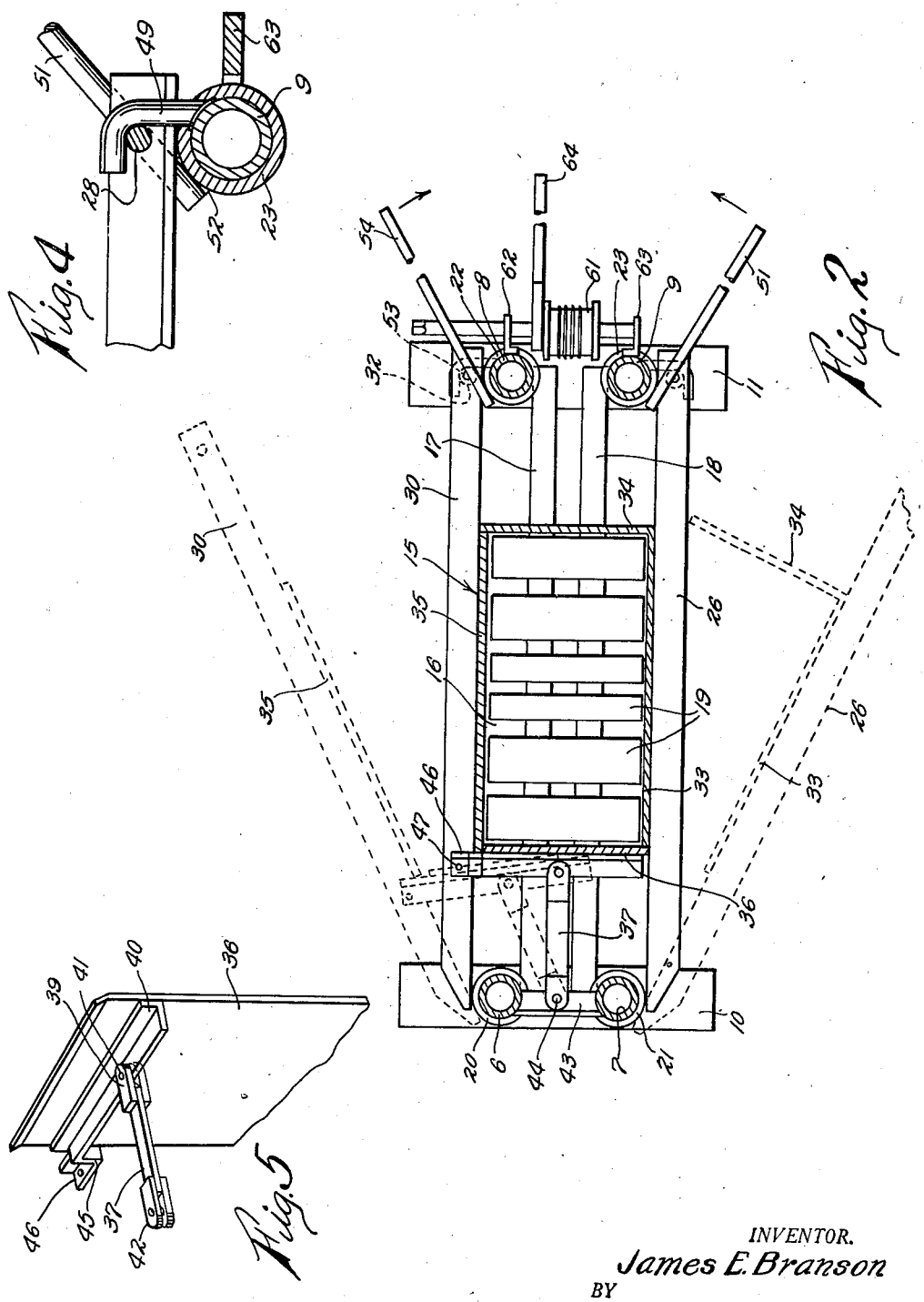

2,420,413

UNITED STATES PATENT OFFICE 2,420,413

BALING PRESS

James E. Branson, Cincinnati, Ohio, assignor to Jerome D. Shanman, Cincinnati, Ohio Application July 24, 1945, Serial No. 606,839

6 Claims. (Cl. 100—19)

The present invention relates to improvements in presses for baling loose, compressible material into compact units for shipment and is particularly directed to a novel bale box for a device of this type.

An object of the invention is to provide a baling press having a simplified structure and which cooperates with the novel structure of a bale box to secure a strong and serviceable machine having few moving parts.

Another object of the invention is to provide in combination with a baling press a novel structure for hingedly mounting the swingable arms for carrying independent portions of a sectional bale box for the press.

A further object of the invention is to provide a sectional baling box having simplified features and in which is incorporated a novel means for relieving the forces on a completed bale when the box is opened for removal of said bale.

Other objects will be apparent from the following specification and drawings wherein a preferred embodiment of my invention is clearly described and in which:

Fig. 1 is a side elevational view of the baling press, parts thereof being shown in central cross-section.

Fig. 2 is a cross-sectional view taken on line 2—2 of Fig. 1.

Fig. 3 is an enlarged, cross-sectional view taken on line 3—3 of Fig. 1.

Fig. 4 is an enlarged, cross-sectional view taken on line 4—4 of Fig. 1.

Fig. 5 is a fragmental, perspective view of the pivotally mounted end wall of my baling box.

My baling press comprises four vertically disposed, tubular corner posts 6, 7, 8 and 9, the end pair of posts 6 and 7 being mounted upon a transversely disposed floor channel 10, whilst the opposed pair of end posts 8 and 9 are mounted upon a floor channel 11. The upper ends of the posts are rigidly connected together by means of two spaced, longitudinally extending channels 12 and 13 which are welded at their ends to the end posts and by transverse channels 14 and 150 fixed at their ends to the said ends of the channels.

A sectional bale box generally indicated by the reference numeral 15 is disposed within the confines of the corner posts and is provided with a bottom 16 comprising two longitudinally extending channels 17 and 18 welded at their ends to the posts 6—8 and 7—9 respectively. The channels support between them a number of spaced, transversely disposed members 19 to form an open bottom for the box so that bale straps for the material compressed in the box may be readily passed through the spaces between the transverse members.

Sleeves 20, 21, 22 and 23 surround the tubular posts 6, 7, 8, and 9 respectively and are supported for free rotational movement in fixed vertical positions on their respective posts by contact of their lower ends with the upper ends of the channels 17 and 18. The foregoing construction is most clearly indicated in Fig. 3 which shows the lower edge 24 of the sleeve 20 resting upon and supported by the upper flange 25 of the channel member 17.

Each of the sleeves 20 and 21 surrounding the pair of end posts 6 and 7 respectively carry a pair of horizontally disposed and longitudinally extending arms. The pair of arms carried by the sleeve 21 comprise two spaced angle irons 26 and 27 anchored at their common ends as by welding or the like to the exterior face of said sleeve. The outer ends of these angle irons are connected by a yoke 28 fastened at its ends to the horizontal portions of the angle irons by bolts 29. Similarly the opposed pair of arms comprise two horizontally disposed and longitudinally extending angle irons 30 and 31 welded at their common ends to the sleeve 20 and connected at their outer ends by a yoke 32 (Fig. 2).

As is most clearly illustrated in Fig. 2, the pairs of opposed arms are mounted for hinged movement with their respective sleeves and may be moved from their contracted closed position illustrated in full lines in said view to an expanded open position indicated in dotted lines thereon. The pair of arms 26—27 carry a composite side wall 33 and end wall 34, said walls being fastened to the vertical portions of the arms by spot welding or the like. The opposed side wall 35 of the sectional box is carried by the arms 30 and 31 and is connected therewith by suitable spot welding, or the like.

The remaining end wall 36 of the sectional box is pivotally mounted on the frame by a pair of vertically spaced links 37 and 38. Both of the links have a similar construction and a description of the upper link 37 as illustrated in Fig. 5, will suffice to clearly indicate the structure of the lower link. The link 37 is provided at its inner end with a forked portion 39 which straddles the horizontal portion of a transversely extending angle iron 40 welded to the end wall 36. The forked portion is pivoted to the angle iron centrally of the end wall by means of a pin 41 which passes through the forked portion and the angle iron. The outer free end of the link 37 is also forked as at 42 for straddling the horizontal portion of an angle iron 43, fixed at its ends to the end posts 6 and 7 of the frame. This forked portion is pivoted to the central part of the angle iron 43 by a pin 44 (Fig. 2). The outer end of the angle iron 40 is bent downwardly at 45 to provide an extension 46 which is pivoted to the arm 30 by a pin 47. The lower link 38 is pivoted at its inner end to a transverse channel member 48 which is mounted between the longitudinal channels 17 and 18.

A pair of vertically spaced hooks 49 and 50 extend from the sleeve 23 and as most clearly indicated in Fig. 4, the inner ends of said hooks are anchored in the sleeve by riveting the inner end thereof to the inner peripheral surface of the sleeve. This pair of hooks engages the yoke 28 for holding the pair of arms 26 and 27 in contracted position. A manually operated lever 51 is welded as at 52 to the sleeve 23 and serves upon rotation to release the hooks 49 and 50 from the yoke 28. Similarly the pair of arms 30 and 31 are held in contracted position by hooks 53 extending from, and anchored in, the sleeve 22, said sleeve being rotated by a manually operated lever 54 to release said hooks.

A means for compressing material held in the bale box may comprise a plunger 55 mounted for vertical reciprocating movement on the upper channel members 12 and 13. Extending upwardly from the central portion of the plunger 55 is a plunger rod 56 carrying at its upper end a pulley wheel 57 and at its lower end a pulley 58. The rod is guided by channels 59 and 60 fixed at their lower ends to the inner sides of the channels 12 and 13. Vertical movement is provided for the plunger for compressing the material in the bale box or for moving the plunger upwardly to its inoperative position, shown in Fig. 2 by means of a drum and ratchet 61 rotatably mounted between two spaced plates 62 and 63 which are fixed to the posts 8 and 9 respectively. As is most clearly illustrated in Figs. 1 and 4 these plates are provided with an offset central portion for clearing their respective rotatable sleeves. The drum and ratchet may be manually operated by a lever 64 and is provided with a mechanism for reversing its operative rotational direction, the mechanical energy set up thereby being transmitted to the plunger by means of a cable 65. One end of the cable is fastened to a take-up anchoring means 66 and passes under a pulley 67 rotatably mounted between the channels 12 and 13. After leaving the pulley 67 the cable passes over the pulley 57 rotatably mounted on the plunger rod 56 and thereafter passes around pulley wheels 68 and 69, each rotatably mounted on the frame and then around the cable drum. The other end of the cable is anchored to an adjustable take-up means 70 and then passes over pulleys 71 and 72 and under the intermediate pulley 58 rotatably mounted on the plunger rod 56. Thereafter the cable passes over a pulley 73 and thence to the pulley drum.

What is claimed is:

1. In a device of the class described the combination of a rectangular frame having four corner posts, a sectional bale box disposed within the marginal outline of the posts, said box having opposed side and end walls and a bottom positioned subjacent the said walls and fixedly mounted between the posts, a hinge element rotatably mounted in a vertically fixed position on each of a pair of end posts, an arm fixed to each element and carrying a side and an end wall of the box, and means on the opposed pair of end posts for locking the arms in contracted positions.

2. In a device of the class described the combination of a rectangular frame having four tubular corner posts, a sectional bale box disposed within the marginal confines of the posts, said box having opposed side and end walls and a bottom subjacent the walls and fixedly mounted between the posts, a sleeve surrounding each of a pair of end posts, means for supporting said sleeves in vertically fixed positions on the posts, an arm fixed to each sleeve and carrying a side and an end wall of the sectional box, and means on the opposed pair of end posts for locking the free ends of the arms in contracted positions.

3. In a device of the class described the combination of a rectangular frame having four tubular corner posts, a sectional bale box disposed within the marginal confines of the posts, said box having opposed side and end walls and a bottom subjacent the walls comprising longitudinal channels fixed at their ends to the posts, and bottom forming members mounted transversely on the channels, a sleeve surrounding each of a pair of end posts, said sleeves being supported in vertically fixed positions by the channels, an arm fixed to each sleeve and carrying a side and an end wall of the sectional box, and means on the opposed pair of end posts for locking the free ends of the arms in contracted positions.

4. In a device of the class described the combination of a rectangular frame having four tubular corner posts, a sectional bale box disposed within the marginal confines of the posts, said box having opposed side and end walls and a bottom positioned subjacent the walls, a sleeve surrounding each of a pair of end posts, means for supporting said sleeves in vertically fixed positions on the posts, an arm fixed at one end to each sleeve, one of said arms carrying a side and end wall of the box, the other arm carrying an opposed side wall, a pair of vertically spaced links pivoted to the remaining end wall of the box and having a pivotal connection at their free end with the frame, means for pivoting the said end wall to the arm carrying the side wall, and means on the opposed pair of end posts for locking the free ends of the arms in contracted positions.

5. In a device of the class described the combination of a rectangular frame having four vertically disposed, tubular corner posts, a sectional bale box disposed within the marginal confines of the posts, said box having opposed side and end walls and a bottom subjacent the walls and comprising longitudinal channels fixed at their ends to the posts, and bottom forming members mounted transversely on the channels, a sleeve surrounding each of the posts and rotatably supported in vertically fixed positions by engagement with the ends of the channels, a pair of horizontally disposed arms fixed at their ends to a sleeve surrounding each of a pair of end posts, a yoke connecting the outer ends of each pair of arms, hooks fixed to the sleeves on the opposed pair of end posts for locking the arms in contracted positions, and each pair of arms being adapted to carry an end wall and a side wall of the sectional bale box.

6. In a device of the class described the combination of a rectangular frame having four vertically disposed, tubular corner posts, a sectional bale box disposed within the marginal confines of the posts, said box having opposed side and end walls and a bottom subjacent the walls and comprising longitudinal channels fixed at their ends to the posts, and bottom forming members mounted transversely on the channels, a sleeve surrounding each of the posts and rotatably supported in vertically fixed positions by engagement with the ends of the channels, a pair of horizontally disposed arms fixed at their ends to a sleeve surrounding each of a pair of end posts, a yoke connecting the outer ends of each pair of arms, hooks fixed to the sleeves on the opposed pair of end posts for locking the arms in contracted positions, means for mounting a side and an end wall of the sectional box to one pair of arms, means for mounting the opposed side wall of the box on the other pair of arms, a pair of vertically spaced links each pivoted to the remaining end wall and having their outer ends pivotally mounted on the frame, and a pivotal connection between the said end wall and the pair of arms carrying the single side wall.

JAMES E. BRANSON.

REFERENCES CITED

The following references are of record in the file of this patent:

UNITED STATES PATENTS

| Number | Name | Date |
|---|---|---|
| 498,052 | Garraux | May 23, 1893 |
| 1,221,767 | Rowley et al. | Apr. 3, 1917 |

FOREIGN PATENTS

| Number | Country | Date |
|---|---|---|
| 515,835 | Great Britain | Dec. 15, 1939 |